(12) United States Patent
Cheng et al.

(10) Patent No.: US 10,581,962 B2
(45) Date of Patent: Mar. 3, 2020

(54) DIRECT COMMUNICATION BETWEEN PHYSICAL SERVER AND STORAGE SERVICE

(71) Applicant: Alibaba Group Holding Limited, Grand Cayman (KY)

(72) Inventors: Gang Cheng, Bellevue, WA (US); Jiesheng Wu, Redmond, WA (US)

(73) Assignee: Alibaba Group Holding Limited (KY)

( * ) Notice: Subject to any disclaimer, the term of this patent is extended or adjusted under 35 U.S.C. 154(b) by 176 days.

(21) Appl. No.: 15/800,815

(22) Filed: Nov. 1, 2017

(65) Prior Publication Data
US 2019/0132383 A1 May 2, 2019

(51) Int. Cl.
| | |
|---|---|
| *G06F 15/16* | (2006.01) |
| *G06F 15/173* | (2006.01) |
| *H04L 29/08* | (2006.01) |
| *H04L 12/46* | (2006.01) |
| *H04L 29/12* | (2006.01) |
| *H04L 29/06* | (2006.01) |

(52) U.S. Cl.
CPC ...... *H04L 67/1023* (2013.01); *H04L 12/4633* (2013.01); *H04L 12/4645* (2013.01); *H04L 61/2564* (2013.01); *H04L 61/2571* (2013.01); *H04L 67/146* (2013.01); *H04L 67/42* (2013.01)

(58) Field of Classification Search
CPC ............ H04L 12/4633; H04L 614/2564
USPC ................................... 709/231, 238
See application file for complete search history.

(56) References Cited

U.S. PATENT DOCUMENTS

| | | | |
|---|---|---|---|
| 6,182,139 B1 * | 1/2001 | Brendel | H04L 29/06 709/201 |
| 7,512,702 B1 * | 3/2009 | Srivastava | H04L 45/00 370/236 |
| 2015/0103838 A1 * | 4/2015 | Zhang | H04L 45/04 370/401 |
| 2015/0124826 A1 * | 5/2015 | Edsall | H04L 12/4633 370/392 |
| 2015/0341428 A1 * | 11/2015 | Chauhan | H04L 69/16 709/203 |
| 2016/0080259 A1 * | 3/2016 | Biancaniello | H04L 45/74 709/203 |
| 2018/0219775 A1 * | 8/2018 | Jiang | H04L 45/74 |
| 2018/0343146 A1 * | 11/2018 | Dunbar | H04L 12/4679 |
| 2019/0116123 A1 * | 4/2019 | Shiell | H04L 12/4641 |
| 2019/0173778 A1 * | 6/2019 | K | H04L 45/306 |
| 2019/0182903 A1 * | 6/2019 | Le | H04L 12/4641 |

* cited by examiner

*Primary Examiner* — Karen C Tang
(74) *Attorney, Agent, or Firm* — Lee & Hayes, P.C.

(57) ABSTRACT

Systems and methods provided herein are directed to allowing a client to access a storage cluster, and the storage cluster to access the client, without having to communicate through the load balancer after an initial communication, or an initial packet from the client to the storage cluster, for packets belonging to the same session as the initial packet based on information included in headers of the packet.

20 Claims, 7 Drawing Sheets

600 ⟶

HEADERS 602 OF INITIAL PACKET 304

| 202 | 204 | 206 | 208 | 210 |
|---|---|---|---|---|
| CLIENT IP ADDRESS | VIP ADDRESS | 0 | CLIENT IP ADDRESS | VIP ADDRESS |

LB REVISED HEADERS 604 OF INITIAL PACKET 304

| 202 | 204 | 206 | 208 | 210 |
|---|---|---|---|---|
| LB IP ADDRESS | FE IP ADDRESS | 0 | CLIENT IP ADDRESS | VIP ADDRESS |

FE REVISED HEADERS 606 OF INITIAL PACKET 304

| 208 | 210 |
|---|---|
| CLIENT IP ADDRESS | FE IP ADDRESS |

HEADERS 608 OF RESPONSE PACKET 310

| 610 | 612 | 614 | 616 | 618 |
|---|---|---|---|---|
| FE IP ADDRESS | CLIENT IP ADDRESS | 0 | VIP ADDRESS | CLIENT IP ADDRESS |

HEADERS 620 OF SUBSEQUENT PACKET 502

| 622 | 624 | 626 | 628 | 630 |
|---|---|---|---|---|
| CLIENT IP ADDRESS | FE IP ADDRESS | 0 | CLIENT IP ADDRESS | VIP ADDRESS |

FIG. 6

DIRECT COMMUNICATION BETWEEN PHYSICAL SERVER AND STORAGE SERVICE

BACKGROUND

One of the major services provided by a cloud service provider is to offer to its customers the provider's infrastructure for running their virtual machines (VMs). To reliably run the VMs, VM images need to be constantly saved from physical servers (also known, or referred to, as computer clusters) in the infrastructure where the VMs are run, to storage servers (also known, or referred to, as storage clusters) in the infrastructure to avoid data loss.

In general, the computer clusters and storage clusters are different clusters that are connected via a datacenter network and a load balancer (LB). Network traffic generated from a client, such as a physical server in the computer cluster, is managed by a virtual switch (VS) hosted on the computer cluster, which only manages the network traffic between the VMs. For example, the client sends a first packet to the LB and the LB selects one of frontend (FE) servers, each FE server having a different IP address, of the storage cluster. The LB then performs some actions on the packet, such as network address translation (NAT) and/or encapsulation, and forwards the packet to the selected FE server. The LB also creates an entry in its session table so that following packets of the same session can be forwarded to the same FE server by simply looking up the table entry. After the FE server receives the first packet, the FE server sends a response to the LB, which forwards the response to the client by looking up the session table.

When the client accesses the storage cluster, all the packets from the client go through the LB. From the client perspective, the client only communicates with a single virtual IP (VIP) address when the client accesses the storage cluster. However, it is the LB that selects an FE server, maps the VIP address the IP address of the selected FE server, performs the NAT, and forwards the packets to the selected FE server. Generally, bandwidth provided by the LB is less than the total physical network bandwidth between the computer cluster and the storage cluster, and the LB becomes the network bottleneck. In addition, the LB poses delays and introduces possible network failure to the connection between the two clusters.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example progression of the initial packet, the response packet, and the subsequent packet.

DETAILED DESCRIPTION

Figure 1:
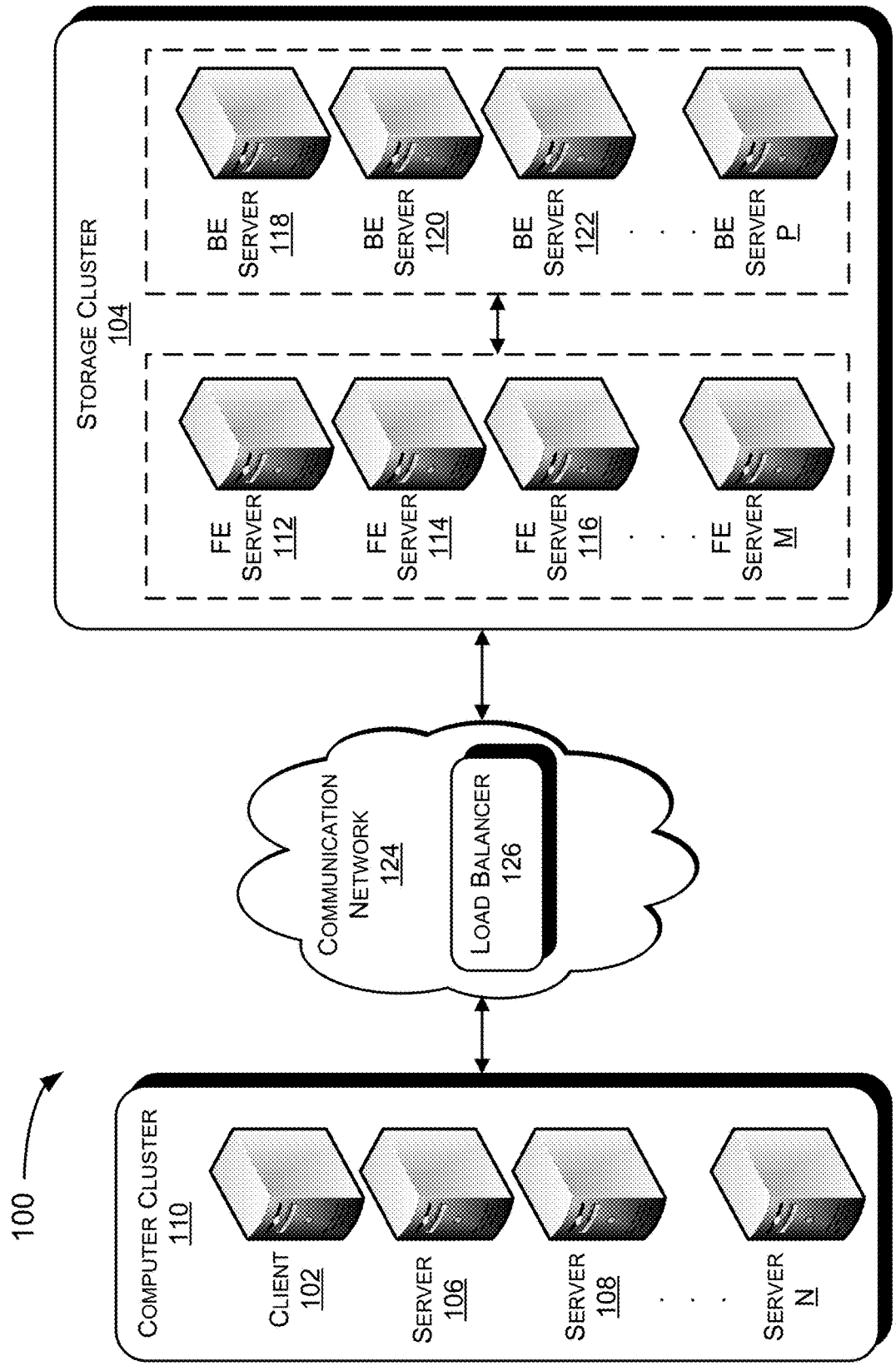
FIG. 1 illustrates an example environment in which a client may access a storage cluster.

Systems and methods discussed herein are directed to communication, or data traffic, between a client and a storage cluster, and more specifically to communication between the client and the storage cluster bypassing a load balancer generally utilized for such communication The systems and methods discussed herein allow the client to access the storage cluster, and the storage cluster to access the client, without having to communicate through the load balancer after an initial communication, or an initial packet from the client to the storage cluster, for packets belonging to the same session as the initial packet.

A client, which may be a physical server of a computer cluster, may send an initial packet, including an IP address of the client (client IP address) and a virtual IP (VIP) address of a storage cluster, destined for the storage cluster. A client virtual switch (VS) of the client may receive the initial packet, create a client session table associated with the initial packet, and encapsulating the initial packet. The initial packet, now encapsulated, may comprise an outer source header having the client IP address, an outer destination header having the VIP address of the storage cluster, an identification header having a value of 0 to indicate the initial packet is from a physical server, an inner source header having the client IP address, and an inner destination header having the VIP address of the storage cluster.

The client VS may then forward the initial packet to a load balancer (LB), which may select a frontend (FE) server of the storage cluster, update the outer source header with an LB IP address of the LB and the outer destination header with an IP address of the selected FE server (FE IP address), and forward the initial packet, now updated with the LB and FE IP addresses, to an FE VS of the selected FE server.

In response to receiving the initial packet at the selected FE server through the FE VS, the FE VS may create a session entry key using the inner headers, create an entry in a FE session table, update the inner destination header with the FE IP address, and forward the initial packet to an appropriate application. In response, the FE server may further create a response packet, which may include the FE IP address and the client IP address, and send the response packet to the FE VS.

In response to receiving the response packet from the FE server, the FE VS may replace the FE IP address with the VIP address of the storage cluster and encapsulate the response packet. The response packet, now encapsulated, may comprise an outer response source header having the FE IP address, an outer response destination header having the client IP address, a response identification header, an inner response source header having the VIP address of the storage cluster, and an inner response destination header having the client IP address. The FE VS then forwards the response packet, based on the outer response IP addresses, directly to the client VS bypassing the LB.

Upon receiving the response packet, the client VS may match the inner response headers with the client session table, determine a corresponding session to the response packet based on the matched inner headers, and determine the FE server a destination for the corresponding session based on the outer headers. For the remaining packets of the same session, the client VS may directly encapsulate the remaining packets with the FE IP address for the outer destination header so that the remaining packets can be directly forwarded to the FE server, thus bypassing the LB, which may cause a network bottleneck due to its available bandwidth.

FIG. 1 illustrates an example environment 100 in which a client 102 may access a storage cluster 104. The client 102 may be one of multiple physical servers (N servers), of which three servers, client 102, server 106, and server 108 are shown for the purpose of this illustration, belonging to a computer cluster 110. The storage cluster 104 may comprise multiple servers including M frontend (FE) servers (three FE servers, 112, 114, and 116 are shown for the purpose of this illustration) and P backend (BE) servers (three BE servers, 118, 120, and 122 are shown for the purpose of this illustration). Packets, which may be encapsulate, are communicated between the computer cluster 110 and the storage cluster 104 through a communication network 124 such as the Ethernet, internet, intranet, and the like, which may be wired, wireless, or a combination of both, and may include a load balancer (LB) 126.

Figure 2:
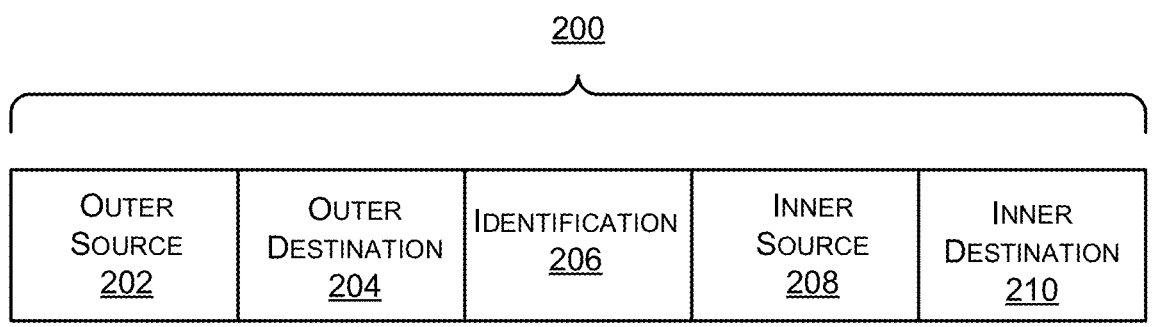
FIG. 2 illustrates example headers of an encapsulated packet.

FIG. 2 illustrates example headers 200 of an encapsulated packet. The headers 200 comprise an outer source header 202 including an IP address of a source, outer destination header 204 including an IP address of a destination, an identification header 206 including a value indicative of an original source, an inner source header 208 including an IP address of a source that may be different from the outer source header 202, and an inner destination 210 including an IP address of a destination that may be different from the outer destination header 204. Depending on the type of the packet, each header may include additional descriptions. For example, for a response packet, a corresponding outer source header may be described as an outer response source header with a corresponding reference number, for a subsequent packet, a corresponding outer source header may be described as an outer subsequent source header with another corresponding reference number, and the like.

Figure 3:
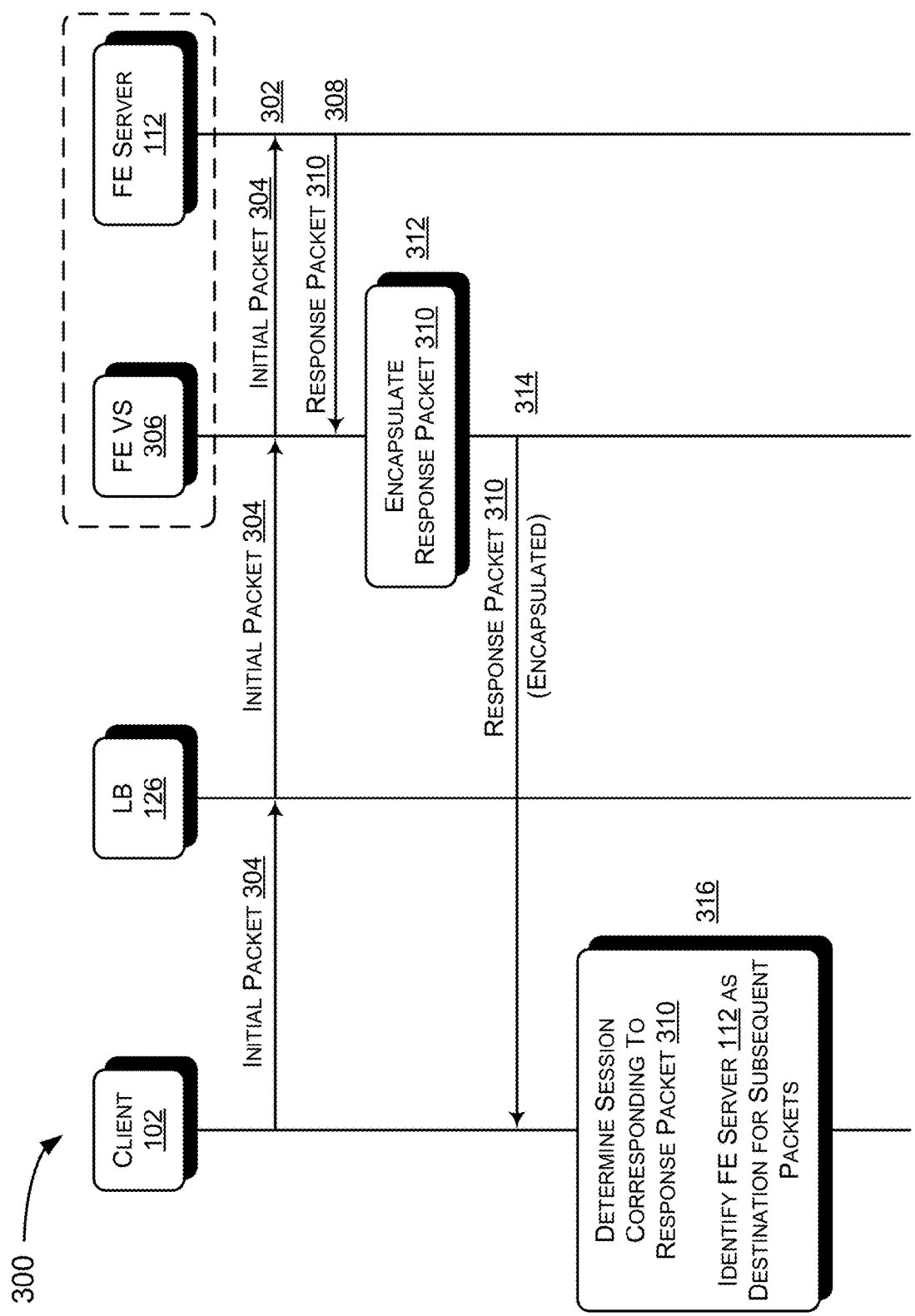
FIG. 3 illustrates an example timing diagram for identifying the frontend server as a direct destination for subsequent packets from the client.

FIG. 3 illustrates an example timing diagram 300 for identifying the FE server 112 as a direct destination for subsequent packets from the client 102.

At 302, the FE server 112 of the storage cluster 104 may receive an initial packet 304 originated from the client 102 through the LB 126 and an FE virtual switch (VS) 306. In response to receiving the initial packet 304, the FE server 112 may generate, at 308, a response packet 310 comprising an IP address of the FE server (FE IP address) and an IP address of the client (client IP address), and forward the response packet 310 to the FE VS 306 of the FE server 112.

In response to receiving the response packet 310, the FE VS 306 may encapsulate the response packet 310, for example, by utilizing virtual extensible local area network (VXLAN) encapsulation at 312. The response packet 310, now encapsulated, may include headers, as described in FIG. 2 above, comprising an outer response source header having the FE IP address, an outer response destination header having the client IP address, a response identification header having a value of 0 to indicate the response packet 306 is from a physical server (FE server 122), an inner response source header having a virtual IP (VIP) address of the storage cluster 104, and an inner response destination header having the client IP address. At 314, the FE VS 306 may then forward the response packet 310 (now encapsulated) directly to the client 102 based on the FE IP address and the client IP address in the outer headers by bypassing the LB 126.

In response to receiving the response packet 310, the client 102, at 316, may determine a session corresponding to the response packet 310 based on the VIP address and the client IP address in the inner headers. The client 102 may also identify the FE server 112 as a destination for subsequent packets of the corresponding session based on the FE IP address and the client IP address in the outer headers.

Figure 4:
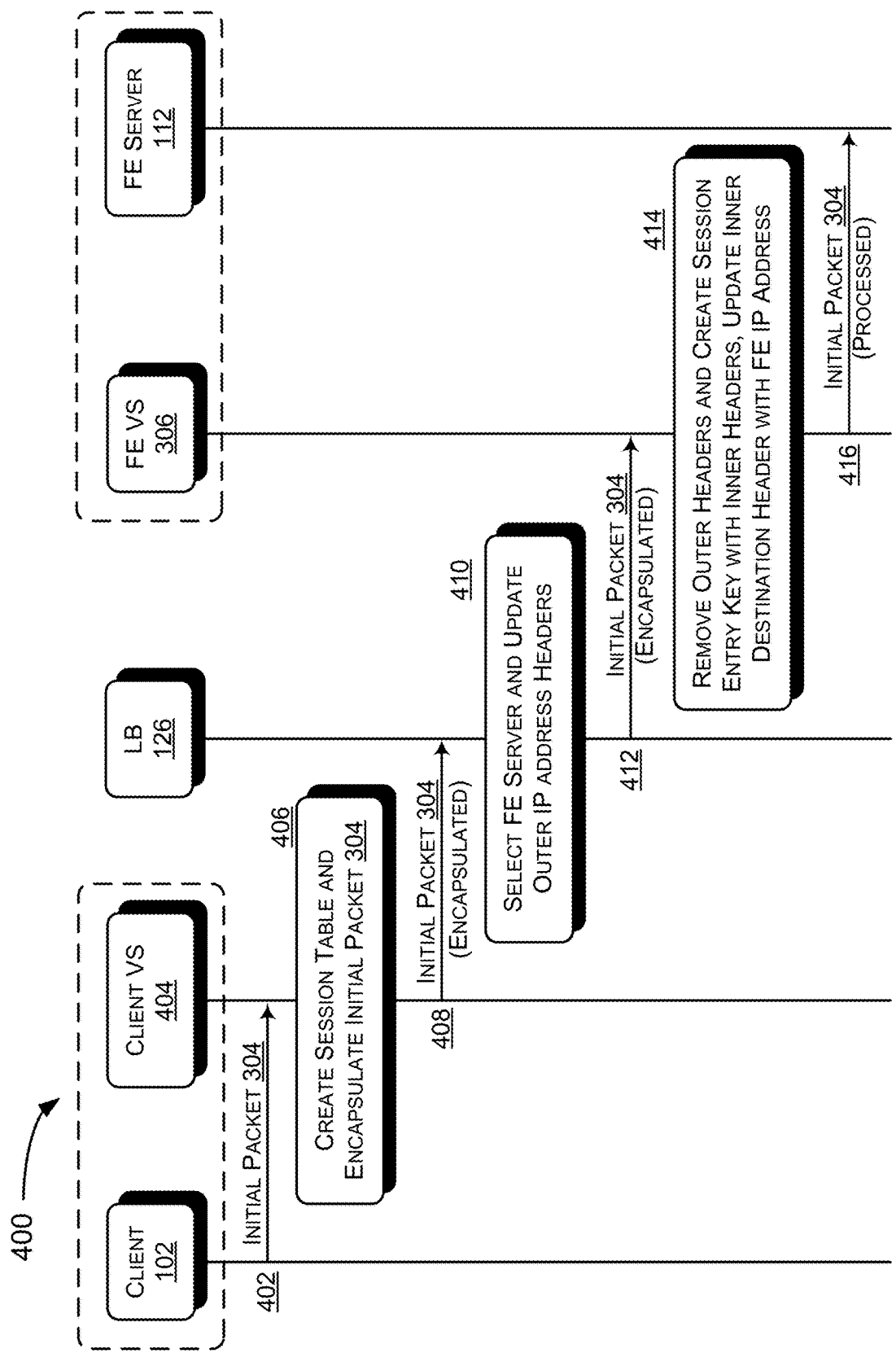
FIG. 4 illustrates an example timing diagram for creating the initial packet received by the frontend server.

FIG. 4 illustrates an example timing diagram 400 for creating the initial packet 304 received by the FE server 112.

At 402, the client 102 may send the initial packet 304 including the client IP address and the VIP address of the storage cluster 104 to a client VS 404 of the client 102. In response to receiving the initial packet 304, the client VS 404 may create a client session table associated with the initial packet 304 and encapsulate the initial packet 304 at 406. Referring back to FIG. 3, at 316, the client 102 may determine a session corresponding to the response packet 310 based on the VIP address and the client IP address in the inner headers by matching the inner headers of the response packet 310 to the client session table created at 406.

The initial packet 304, now encapsulated, may include headers, as described in FIG. 2 above, comprising an outer source header having the client IP address, an outer destination header having the VIP address of the storage cluster 104, an identification header having a value of 0 to indicate the initial packet 304 is from a physical server (client 102), an inner source header having the client IP address, and an inner destination header having the VIP address of the storage cluster 104. At 408, the client VS 404 may forward the initial packet 304 to the LB 126.

In response to receiving the initial packet 304, the LB 126, at 410, may select an FE server, such as the FE server 112 having the FE IP address, of the storage cluster 104 as a destination for the initial packet 304, and update the outer source header with an LB IP address of the LB 126 and the outer destination header with the FE IP address. At 412, the LB 126 may forward the initial packet 304, now updated, to the FE server 112 based on the outer headers via the FE VS 306 of the FE server 112.

In response to receiving the initial packet 304, the FE VS 306, at 414, may process the initial packet 304 by removing the outer headers and creating a session entry key using the inner headers, creating an entry in a FE session table, and updating the inner destination header with the FE IP address. The FE VS 306 may then forward the processed initial packet 304 to an appropriate application in the FE server 112 at 416.

Referring back to FIG. 3, the processes of 316 may be performed by the client VS 404 of the client 102.

Figure 5:
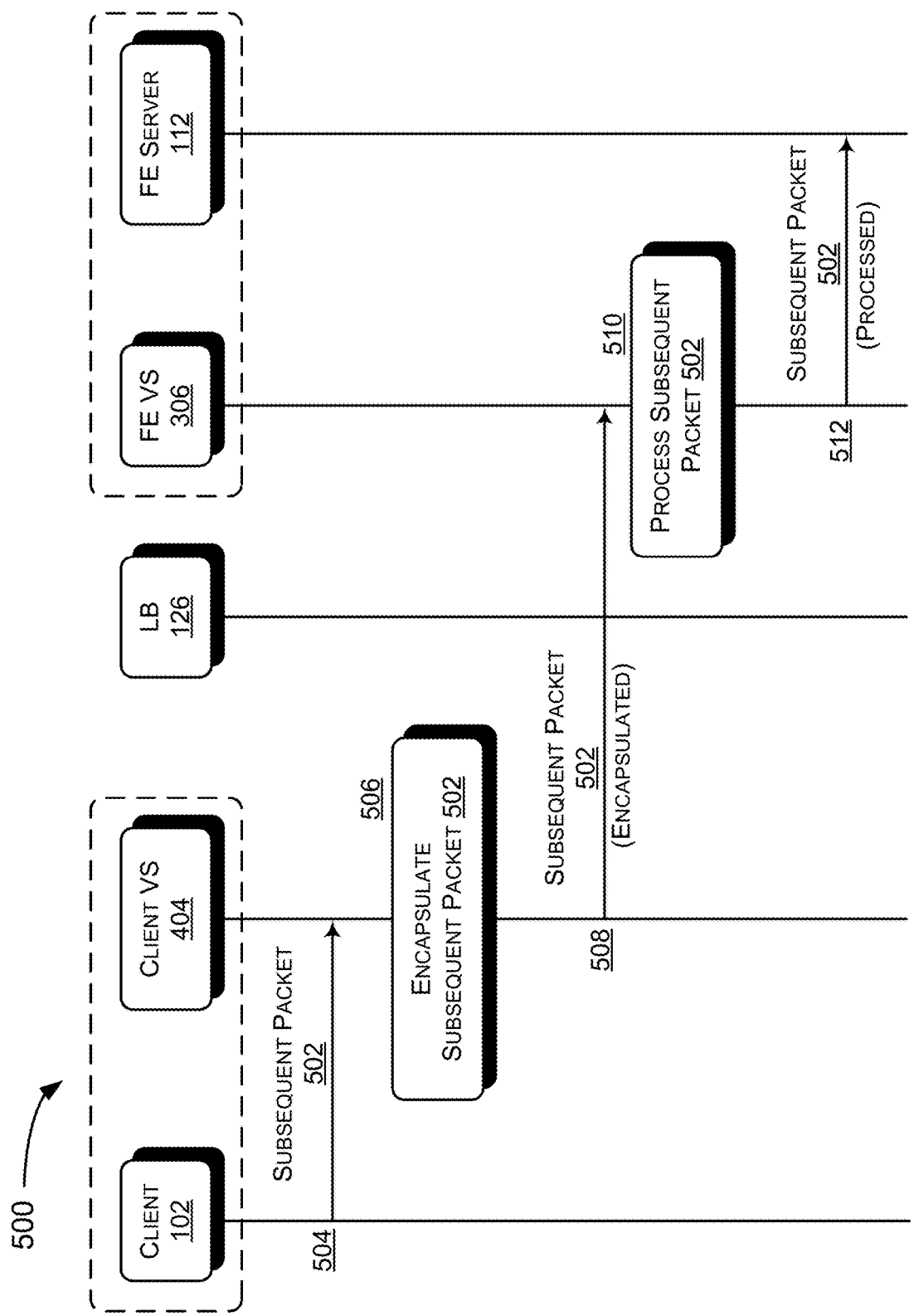
FIG. 5 illustrates an example timing diagram for sending subsequent packets directly to the frontend server from the client.

FIG. 5 illustrates an example timing diagram 500 for sending subsequent packets directly to the FE server 112 from the client 102.

Following the steps illustrated in FIG. 3, the client 102 may send a subsequent packet 502 of the corresponding session to the client VS 404 at 504. In response to receiving the subsequent packet 502, the client VS 404 may encapsulate the subsequent packet 502 at 506. The subsequent packet 502, now encapsulated, may include headers, as described in FIG. 2 above, including an outer subsequent source header having the client IP address, an outer subsequent destination header having the FE IP address, the identification header having a value of 0 to indicate the subsequent packet is from a physical server (client 102), an inner subsequent source header having the client IP address, and an inner subsequent destination header having the VIP address of the storage cluster. At 508, the client VS 404 may forward the subsequent packet 502 directly to the FE server 112 by bypassing the LB 126 based on the outer source header and the outer destination header of the subsequent packet. The FE VS 306 of the FE server 112 may receive the subsequent packet 502 at 510 and process subsequent packet 502 as described above with reference to FIG. 4 at 414. The FE VS 306 may then forward the subsequent packet 502 to an appropriate application in the FE server 112 at 512.

FIG. 6 illustrates an example progression 600 of the initial packet 304, the response packet 306, and the subsequent packet 502.

The client VS 404 may encapsulate the initial packet 304, generated by the client 102 and including the client IP address and the VIP address of the storage cluster 104, as described above with reference to FIG. 4. Headers 602 of the initial packet 304, now encapsulated, may include headers comprising the outer source header 202 having the client IP address, the outer destination header 204 having the VIP address of the storage cluster 104, the identification header 206 having a value of 0 to indicate the initial packet 304 is from the client 102, the inner source header 208 having the client IP address, and an inner destination header 210 having the VIP address of the storage cluster 104.

The LB 126 may receive the initial packet 304 and revise the headers 602 as described above with reference to FIG. 4. The LB revised header 604 of the initial packet 304 includes updates made by the LB 126 now showing the outer source header 202 with the LB IP address and the outer destination header 204 with the FE IP address.

As described above with reference to FIG. 4, the FE VS 306 may then receive the initial packet 304, remove the outer headers and create a session entry key using the inner headers, create an entry in a FE session table, update the inner destination header with the FE IP address, and forward the initial packet 304 to an appropriate application based on the FE revised headers 606.

As described above with reference to FIG. 3, the FE server 112 may generate a response packet 310 including the FE IP address and the client IP address, and the FE VS 306 may encapsulate the response packet 310. Headers 608 of the response packet 310, now encapsulated, may include headers comprising an outer response source header 610 having the FE IP address, an outer response destination header 612 having the client IP address, a response identification header 614 having a value of 0 to indicate the response packet 310 is from the FE server 122, an inner response source header 616 having the VIP address of the storage cluster 104, and an inner response destination header 618 having the client IP address. The FE VS 306 may then forward the response packet 306 directly to the client 102 based on the FE IP address and the client IP address in the outer headers bypassing the LB 126.

As described above with reference to FIG. 3, in response to receiving the response packet 310, the client 102 may determine a session corresponding to the response packet 310 based on the VIP address and the client IP address in the inner headers 616 and 618, and identify the FE server 112 as the destination for subsequent packets of the corresponding session based on the FE IP address and the client IP address in the outer headers 610 and 612.

Based on the response packet 310, the client 102 may generate the subsequent packet 502, which may be encapsulated with the FE IP address in the outer response source header 610 of the response packet 310 so that the subsequent packet 502 may be directly forwarded to the FE server 112 bypassing the LB 126. Headers 620 of the encapsulated subsequent packet 502 may comprise the outer subsequent source header 622 having the client IP address, the outer subsequent destination header 624 having the FE IP address, the identification header having a value of 0 to indicate the subsequent packet is from the client 102, the inner subsequent source header 628 having the client IP address, the inner subsequent destination header 630 having the VIP address of the storage cluster. Based on the client IP address and the FE IP address in the outer headers 622 and 624, the client VS 404 may forward the subsequent packet 502 directly to the FE server 112 by bypassing the LB 126 at 508 as described above with reference to FIG. 5.

Figure 7:
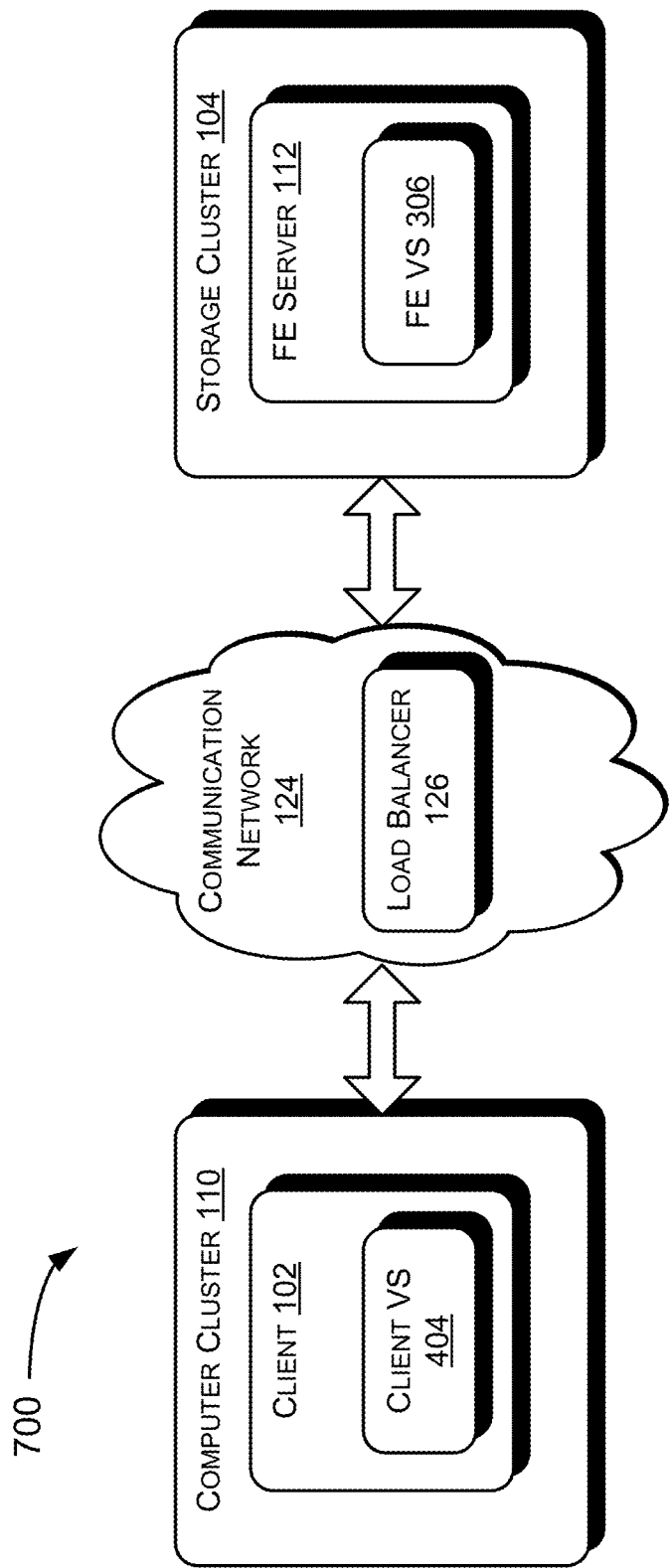
FIG. 7 illustrates an example block diagram of a storage access system.

FIG. 7 illustrates an example block diagram of a storage access system 700.

The storage access system 700 may comprise the computer cluster 110 and the storage cluster 104. The computer cluster 110 may include the client 102, and the storage cluster 104 may include the FE server 112. The computer cluster 110 and the storage cluster 104 may be communicatively coupled via the communication network 124 such as the internet, intranet, and the like, which may be wired, wireless, or a combination of both. The client 102, having the client IP address, may include the client VS 404, and the FE server 112, having the FE IP address, may include the FE VS 306. The storage access system may further comprise the LB 126 having the LB IP address, which may be a part of the communication network 124.

As described above with reference to FIGS. 3 and 4, the client 102 may be configured to send the initial packet 304 via the client VS 404 to the storage cluster 104 via the LB 126, and the FE server 112 may be configured to receive the initial packet 304 via the FE VS 306. The client VS may be configured to generate a client session table, which includes information associated with the initial packet 304, upon receiving the initial packet 304 from the client 102 destined for the storage cluster 104. The LB 126 may be configured to select a FE server such as the FE server 112, update the outer destination header 204 with the FE IP address, and forward the initial packet 304 to the FE server 112.

In response to receiving the initial packet 304 at the FE VS 306 of the FE server 112, the FE server 112 may be further configured to generate the response packet 306 including the FE IP address and the client IP address. The FE VS 308 may be configured to encapsulate the response packet 310, and send the response packet 310 (encapsulated) by the FE VS 306 to the client 102 by bypassing the LB 126 based on the FE IP address and the client IP address. The response packet 310 (encapsulated) may comprise the outer response source header 610 having the FE IP address, the outer response destination header 612 having the client IP address, the inner response source header 616 having the VIP address of the storage cluster 104, and the inner response destination header 618 having the client IP address as described above with reference to FIGS. 3 and 6.

The client VS 404 may be configured to receive the response packet 310 (encapsulated). In response to receiving the response packet 306, the client VS 404 may be further configured to determine a session corresponding to the response packet 306 by matching the inner response source header 610 and the inner response destination header 612 to the client session table to determine the session corresponding to the response packet 310, and identify the FE server 112 as a destination for subsequent packets of the corresponding session based on the outer response source header 610 and the outer response destination header 612 as described above with reference to FIGS. 3 and 6.

The client VS 404 may be further configured receive the subsequent packet 502 of the corresponding session, encapsulate the subsequent packet 502, and forward the subsequent packet 502 directly to the FE server 112 by bypassing the LB 126 based on the outer subsequent source header 622 and the outer subsequent destination header 624 as described above with reference to FIGS. 5 and 6.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A method for accessing a storage cluster from a client, the method comprises: receiving, by a frontend (FE) server of the storage cluster via a load balance (LB), an initial packet originated from the client; in response to receiving the initial packet by the FE server, 1) generating, by the FE server, a response packet comprising an internet protocol (IP) address of the FE server (FE IP address) and an IP address of the client (client IP address); 2) encapsulating the response packet by the FE server; and 3) sending, by the FE server, the encapsulated response packet to the client by bypassing the LB based on the FE IP address and the client IP address.

B. A method as paragraph A recites, wherein encapsulating the response packet by the FE server comprises: encapsulating the response packet, by an FE virtual switch (VS) of the FE server, the encapsulated response packet comprising an outer response source header having the FE IP address, an outer response destination header having the client IP address, an inner response source header having a virtual IP (VIP) address of the storage cluster, and an inner response destination header having the client IP address.

C. A method as paragraph B recites, further comprises: receiving, by the client, the encapsulated response packet; in response to receiving the encapsulated response packet by the client: 1) determining, by the client, a session corresponding to the encapsulated response packet based on the inner response source header and the inner response destination header; and 2) identifying, by the client, the FE server as a destination for subsequent packets of the corresponding session based on the outer response source header and the outer response destination header.

D. A method as paragraph C recites, further comprises: sending, from the client, a subsequent packet of the corresponding session to a client VS of the client; encapsulating, by the client VS, the subsequent packet, the encapsulated subsequent packet comprising an outer source header having the client IP address, an outer destination header having the FE IP address, an inner source header having the client IP address, and an inner destination header having the VIP address of the storage cluster; and forwarding, by the client VS, the encapsulated subsequent packet to the FE server by bypassing the LB based on the outer source header and the outer destination header of the subsequent packet.

E. A method paragraph D recites, wherein encapsulating comprises encapsulating using virtual extensible local area network (VXLAN) encapsulation.

F. A method as paragraph C recites, wherein determining, by the client, the session corresponding to the encapsulated response packet based on the inner response source header and the inner response destination header comprises: matching the inner response source header and the inner response destination header to a client session table, the client session table created by a client virtual switch (VS) of the client upon receiving the initial packet destined for the storage cluster from the client, the client session table having information associated with the initial packet.

G. A method as paragraph A recites, wherein receiving, by the FE server of the storage cluster via the LB, the initial packet originated from the client comprises: sending, by the client to the LB, the initial packet encapsulated by a client virtual switch of the client, the initial packet destined for the storage cluster, the initial packet comprising an outer source header having the client IP address and an outer destination header having the VIP address of the storage cluster; selecting the FE server by the LB; updating, by the LB, the outer destination header with the FE IP address; and forwarding, by the LB, the initial packet to the FE server.

H. A non-transitory computer-readable storage medium storing computer-readable instructions executable by one or more processors, that when executed by the one or more processors, cause the one or more processors to perform operations, the operations comprise: receiving, by a frontend (FE) server of the storage cluster via a load balancer (LB), an initial packet originated from the client; in response to receiving the initial packet by the FE server: 1) generating, by the FE server, a response packet comprising an internet protocol (IP) address of the FE server (FE IP address) and an IP address of the client (client IP address); 2) encapsulating the response packet by the FE server; and 3) sending, by the FE server, the encapsulated response packet to the client by bypassing the LB based on the FE IP address and the client IP address.

I. A non-transitory computer-readable storage medium as paragraph H recites, wherein encapsulating the response packet by the FE server comprises: encapsulating the response packet, by an FE virtual switch (VS) of the FE server, the encapsulated response packet comprising an outer response source header having the FE IP address, an outer response destination header having the client IP address, an inner response source header having a virtual IP (VIP) address of the storage cluster, and an inner response destination header having the client IP address.

J. A non-transitory computer-readable storage medium as paragraph I recites, wherein the operations further comprise: receiving the encapsulated response packet by the client; in response to receiving the encapsulated response packet by the client: 1) determining, by the client, a session corresponding to the encapsulated response packet based on the inner response source header and the inner response destination header; and 2) identifying, by the client, the FE server as a destination for subsequent packets of the corresponding session based on the outer response source header and the outer response destination header.

K. A non-transitory computer-readable storage medium as paragraph J recites, wherein the operations further comprise: sending, from the client, a subsequent packet of the corresponding session to a client VS of the client; encapsulating, by the client VS, the subsequent packet, the encapsulated subsequent packet comprising an outer source header having the client IP address, an outer destination header having the FE IP address, an inner source header having the client IP address, and an inner destination header having the VIP address of the storage cluster; and forwarding, by the client VS, the encapsulated subsequent packet to the FE server by bypassing the LB based on the outer source header and the outer destination header of the subsequent packet.

L. A non-transitory computer-readable storage medium as paragraph K recites, wherein encapsulating comprises encapsulating using virtual extensible local area network (VXLAN) encapsulation.

M. A non-transitory computer-readable storage medium as paragraph J recites, wherein determining, by the client, the session corresponding to the encapsulated response packet based on the inner response source header and the inner response destination header comprises: matching the inner response source header and the inner response destination header to a client session table, the client session table created by a client virtual switch (VS) of the client upon receiving the initial packet destined for the storage cluster from the client, the client session table having information associated with the initial packet.

N. A non-transitory computer-readable storage medium as paragraph H recites, wherein receiving, by the FE server of the storage cluster via the LB, the initial packet originated from the client comprises: sending, by the client to the LB, the initial packet encapsulated by a client virtual switch of the client, the initial packet destined for the storage cluster, the initial packet comprising an outer source header having the client IP address and an outer destination header having the VIP address of the storage cluster; selecting the FE server by the LB; updating, by the LB, the outer destination header with the FE IP address; and forwarding, by the LB, the initial packet to the FE server.

O. A storage access system comprises: a client configured to send an initial packet to a storage cluster via a load balancer (LB), the client having a client internet protocol (IP) address; and a front end (FE) server of the storage cluster configured to receive the initial packet, the FE server, in response to receiving the initial packet, further configured to: 1) generate a response packet comprising an internet protocol (IP) address of the FE server (FE IP address) and an IP address of the client (client IP address), 2) encapsulate the response packet, and 3) send the encapsulated response packet to the client by bypassing the LB based on the FE IP address and the client IP address.

P. A storage access system as paragraph O recites, wherein the FE server comprises an FE virtual switch (VS) configured to encapsulate the response packet, the encapsulated response packet comprising an outer response source header having the FE IP address, an outer response destination header having the client IP address, an inner response source header having a virtual IP (VIP) address of the storage cluster, and an inner response destination header having the client IP address.

Q. A storage access system as paragraph P recites, wherein the client comprises a client VS, the client VS is configured to: receive the encapsulated response packet; and in response to receiving the encapsulated response packet: 1) determine a session corresponding to the encapsulated response packet based on the inner response source header and the inner response destination header; 2) identify the FE server as a destination for subsequent packets of the corresponding session based on the outer response source header and the outer response destination header; 3) receive a subsequent packet of the corresponding session; 4) encapsulate the subsequent packet, the encapsulated subsequent packet comprising an outer source header having the client IP address, an outer destination header having the FE IP address, an inner source header having the client IP address, and an inner destination header having the VIP address of the storage cluster; and 5) forward the encapsulated subsequent packet to the FE server by bypassing the LB based on the outer source header and the outer destination header of the subsequent packet.

R. A storage access system as paragraph Q recites, wherein virtual extensible local area network (VXLAN) encapsulation is use to encapsulate initial and subsequent packets.

S. A storage access system as paragraph Q recites, wherein the client VS is further configured to 1) generate a client session table upon receiving the initial packet from the client destined for the storage cluster, the client session table having information associated with the initial packet; and 2) match the inner response source header and the inner response destination header to the client session table to determine the session corresponding to the encapsulated response packet.

S. A storage access system as paragraph O recites, wherein the LB is further configured to 1) receive, from the client, the initial packet encapsulated by a client virtual switch of the client, the initial packet destined for the storage cluster, the initial packet comprising an outer source header having the client IP address and an outer destination header having the VIP address of the storage cluster; 2) select the FE server; 3) update the outer destination header with the FE IP address; and 4) forward the initial packet to the FE server.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, by a frontend (FE) server of a storage cluster via a load balance (LB), an initial packet originated from a client;
   in response to receiving the initial packet by the FE server:
      generating, by the FE server, a response packet comprising an internet protocol (IP) address of the FE server (FE IP address) and an IP address of the client (client IP address),
      encapsulating the response packet by the FE server, the encapsulated response packet comprising an outer response source header having the FE IP address and an outer response destination header having the client IP address, and
      sending, by the FE server, the encapsulated response packet to the client by bypassing the LB based on the FE IP address and the client IP address;
   receiving, by the client, the encapsulated response packet; and
   in response to receiving the encapsulated response packet by the client, identifying, by the client, the FE server as a destination for subsequent packets of a corresponding session based on the outer response source header and the outer response destination header of the encapsulated response packet.

2. The method of claim 1,
   wherein encapsulating the response packet by the FE server includes encapsulating the response packet by an FE virtual switch (VS) of the FE server, and
   wherein the encapsulated response packet further comprises an inner response source header having a virtual IP (VIP) address of the storage cluster and an inner response destination header having the client IP address.

3. The method of claim 2, further comprising:
   determining, by the client, a session corresponding to the encapsulated response packet based on the inner response source header and the inner response destination header.

4. The method of claim 3, further comprising:
   sending, from the client, a subsequent packet of the corresponding session to a client VS of the client;
   encapsulating, by the client VS, the subsequent packet, the encapsulated subsequent packet comprising an outer source header having the client IP address, an outer destination header having the FE IP address, an inner source header having the client IP address, and an inner destination header having the VIP address of the storage cluster; and
   forwarding, by the client VS, the encapsulated subsequent packet to the FE server by bypassing the LB based on the outer source header and the outer destination header of the subsequent packet.

5. The method of claim 4, wherein encapsulating comprises encapsulating using virtual extensible local area network (VXLAN) encapsulation.

6. The method of claim 3, wherein determining, by the client, the session corresponding to the encapsulated response packet based on the inner response source header and the inner response destination header comprises:
   matching the inner response source header and the inner response destination header to a client session table, the client session table created by a client virtual switch (VS) of the client upon receiving the initial packet destined for the storage cluster from the client, the client session table having information associated with the initial packet.

7. The method of claim 1, wherein receiving, by the FE server of the storage cluster via the LB, the initial packet originated from the client comprises:
   sending, by the client to the LB, the initial packet encapsulated by a client virtual switch of the client, the initial packet destined for the storage cluster, the initial packet comprising an outer source header having the client IP address and an outer destination header having the VIP address of the storage cluster;
   selecting the FE server by the LB;
   updating, by the LB, the outer destination header with the FE IP address; and
   forwarding, by the LB, the initial packet to the FE server.

8. A non-transitory computer-readable storage medium storing computer-readable instructions executable by one or more processors, that when executed by the one or more processors, cause the one or more processors to perform operations comprising:
   receiving, by a frontend (FE) server of the storage cluster via a load balancer (LB), an initial packet originated from the client;
   in response to receiving the initial packet by the FE server:
      generating, by the FE server, a response packet comprising an internet protocol (IP) address of the FE server (FE IP address) and an IP address of the client (client IP address);
      encapsulating the response packet by the FE server, the encapsulated response packet comprising an outer response source header having the FE IP address and an outer response destination header having the client IP address;
      sending, by the FE server, the encapsulated response packet to the client by bypassing the LB based on the FE IP address and the client IP address; and
      identifying, by the client, the FE server as a destination for subsequent packets of the corresponding session based on the outer response source header and the outer response destination header of the encapsulated response packet.

9. The non-transitory computer-readable storage medium of claim 8,
   wherein encapsulating the response packet by the FE server includes encapsulating the response packet by an FE virtual switch (VS) of the FE server, and
   wherein the encapsulated response packet further comprises an inner response source header having a virtual IP (VIP) address of the storage cluster and an inner response destination header having the client IP address.

10. The non-transitory computer-readable storage medium of claim 9, wherein the operations further comprise:
  determining, by the client, a session corresponding to the encapsulated response packet based on the inner response source header and the inner response destination header.

11. The non-transitory computer-readable storage medium of claim 10, wherein the operations further comprise:
  sending, from the client, a subsequent packet of the corresponding session to a client VS of the client;
  encapsulating, by the client VS, the subsequent packet, the encapsulated subsequent packet comprising an outer source header having the client IP address, an outer destination header having the FE IP address, an inner source header having the client IP address, and an inner destination header having the VIP address of the storage cluster; and
  forwarding, by the client VS, the encapsulated subsequent packet to the FE server by bypassing the LB based on the outer source header and the outer destination header of the subsequent packet.

12. The non-transitory computer-readable storage medium of claim 11, wherein encapsulating comprises encapsulating using virtual extensible local area network (VXLAN) encapsulation.

13. The non-transitory computer-readable storage medium of claim 10, wherein determining, by the client, the session corresponding to the encapsulated response packet based on the inner response source header and the inner response destination header comprises:
  matching the inner response source header and the inner response destination header to a client session table, the client session table created by a client virtual switch (VS) of the client upon receiving the initial packet destined for the storage cluster from the client, the client session table having information associated with the initial packet.

14. The non-transitory computer-readable storage medium of claim 8, wherein receiving, by the FE server of the storage cluster via the LB, the initial packet originated from the client comprises:
  sending, by the client to the LB, the initial packet encapsulated by a client virtual switch of the client, the initial packet destined for the storage cluster, the initial packet comprising an outer source header having the client IP address and an outer destination header having the VIP address of the storage cluster;
  selecting the FE server by the LB;
  updating, by the LB, the outer destination header with the FE IP address; and
  forwarding, by the LB, the initial packet to the FE server.

15. A storage access system comprising:
  a client configured to send an initial packet to a storage cluster via a load balancer (LB), the client having a client internet protocol (IP) address; and
  a front end (FE) server of the storage cluster configured to receive the initial packet, the FE server, in response to receiving the initial packet, further configured to:
    generate a response packet comprising an internet protocol (IP) address of the FE server (FE IP address) and an IP address of the client (client IP address),
    encapsulate the response packet, the encapsulated response packet comprising an outer response source header having the FE IP address, an outer response destination header having the client IP address, and
    send the encapsulated response packet to the client by bypassing the LB based on the FE IP address and the client IP address,
  wherein the client comprises a client virtual switch (VS), the client VS configured to:
    receive the encapsulated response packet; and
    in response to receiving the encapsulated response packet, identify the FE server as a destination for subsequent packets of the corresponding session based on the outer response source header and the outer response destination header of the encapsulated response packet.

16. The storage access system of claim 15,
  wherein the FE server comprises an FE virtual switch (VS) configured to encapsulate the response packet, and
  wherein the encapsulated response packet further comprises an inner response source header having a virtual IP (VIP) address of the storage cluster and an inner response destination header having the client IP address.

17. The storage access system of claim 16, wherein the client VS is further configured to, in response to receiving the encapsulated response packet:
  determine a session corresponding to the encapsulated response packet based on the inner response source header and the inner response destination header;
  receive a subsequent packet of the corresponding session;
  encapsulate the subsequent packet, the encapsulated subsequent packet comprising an outer source header having the client IP address, an outer destination header having the FE IP address, an inner source header having the client IP address, and an inner destination header having the VIP address of the storage cluster; and
  forward the encapsulated subsequent packet to the FE server by bypassing the LB based on the outer source header and the outer destination header of the subsequent packet.

18. The storage access system of claim 17, wherein virtual extensible local area network (VXLAN) encapsulation is used to encapsulate initial and subsequent packets.

19. The storage access system of claim 17, wherein the client VS is further configured to:
  generate a client session table upon receiving the initial packet from the client destined for the storage cluster, the client session table having information associated with the initial packet; and
  match the inner response source header and the inner response destination header to the client session table to determine the session corresponding to the encapsulated response packet.

20. The storage access system of claim 15, wherein the LB is further configured to:
  receive, from the client, the initial packet encapsulated by a client virtual switch of the client, the initial packet destined for the storage cluster, the initial packet comprising an outer source header having the client IP address and an outer destination header having the VIP address of the storage cluster;

select the FE server;
update the outer destination header with the FE IP address; and
forward the initial packet to the FE server.

* * * * *